United States Patent [19]
Michelsen et al.

[11] Patent Number: 5,537,572
[45] Date of Patent: Jul. 16, 1996

[54] CACHE CONTROLLER AND METHOD FOR DUMPING CONTENTS OF A CACHE DIRECTORY AND CACHE DATA RANDOM ACCESS MEMORY (RAM)

[75] Inventors: Jeff M. Michelsen, Mesa; Joseph Murray, Scottsdale, both of Ariz.

[73] Assignee: VLSI Technology, Inc., San Jose, Calif.

[21] Appl. No.: 860,812

[22] Filed: Mar. 31, 1992

[51] Int. Cl.⁶ ................................................ G06F 12/00
[52] U.S. Cl. .................. 395/462; 395/403; 395/421.07; 395/493; 395/421.08; 364/DIG. 1; 364/238.4; 364/243.41; 364/251
[58] Field of Search .................................. 395/425, 400, 395/575, 403, 421.07, 431, 432, 445, 452, 453, 460, 462, 486, 493, 421.08, 183.18, 182.03; 371/21.1

[56] References Cited

U.S. PATENT DOCUMENTS

| | | | |
|---|---|---|---|
| 4,426,682 | 1/1984 | Riffe et al. | 395/462 |
| 4,493,026 | 1/1985 | Olnowich | 395/455 |
| 4,740,889 | 4/1988 | Motersole et al. | 395/465 |
| 4,775,955 | 10/1988 | Liu | 395/472 |
| 5,010,475 | 4/1991 | Hazawa | 395/403 |
| 5,195,096 | 3/1993 | Moore | 371/21.1 |
| 5,276,833 | 1/1994 | Auvinen et al. | 395/432 |
| 5,287,481 | 2/1994 | Lin | 395/462 |
| 5,317,711 | 5/1994 | Bourekas et al. | 395/184.01 |
| 5,414,827 | 5/1995 | Lin | 395/462 |

*Primary Examiner*—Glenn Gossage
*Attorney, Agent, or Firm*—Douglas L. Weller

[57] ABSTRACT

A cache memory controller and method for dumping the contents of a cache directory and a cache data random access memory (RAM) are described. In order to dump the contents of the cache directory, access to the cache data RAM is disabled by disabling the cache controller. Then, address tags within the cache directory are read sequentially from a reserved register. In order to dump the contents of the cache data RAM, new addresses are allocated to data in the cache data RAM. This is done, for example, by blocking writes to the cache data RAM while enabling read access from the cache data RAM and both read and write access to the cache directory. A reserved block of cacheable memory within, for example, the main system memory, is accessed. When the reserved block of cacheable memory is accessed, address tags for addresses of the reserved block of cacheable memory are written into the cache directory; however, data from the reserved block of cacheable memory is not written into the cache data RAM. Data in the cache data RAM is now accessible using addresses for the reserved block of cacheable memory. In a preferred embodiment, the cache controller includes non-cacheable RAM registers, multiplexers, a sequencer, a cache data RAM controller having logic circuitry for suppressing/gating cache write enable signals, a system controller interface, configuration/diagnostic registers and a cache directory set.

6 Claims, 7 Drawing Sheets

CACHE CONTROLLER AND METHOD FOR DUMPING CONTENTS OF A CACHE DIRECTORY AND CACHE DATA RANDOM ACCESS MEMORY (RAM)

BACKGROUND

The present invention concerns a cache controller that allows a cache dump. The cache dump feature is useful in the debugging of cache operations.

In a computer system, the operating speed of the system processor is dependent upon the rate at which data can be exchanged between main memory and the processor. In an attempt to reduce the time required for the exchange of data between the processor and main memory, many computer systems include a cache memory placed between the processor and main memory.

A cache memory is a small, high-speed buffer memory that is used to temporarily store portions of the contents of main memory. In selecting which portions of the contents of main memory to store, a cache controller estimates which data will soon be requested by the processor. The increased access speed of the cache memory generally results in a reduction in the average time necessary for the processor to access data from main memory.

A cache memory consists of many blocks of one or more words of data. Each block has associated with it an address tag. The address tags of data blocks currently residing in the cache memory are stored in a cache directory (also called a tag random access memory (RAM)). Each address tag uniquely identifies a block of data in the main memory. Each time the processor makes a memory reference, a comparison is made between an address tag of the accessed data and the address tags stored stand in the cache directory. If the desired data is in the cache, the cache provides the data to processor. If the desired memory block is not in the cache, the block of data containing the requested data is retrieved from the main memory, stored in the cache and supplied to the processor.

In addition to using a cache to retrieve data from main memory, the processor may also write data into the cache. Data is written to the cache instead of writing the data directly to the main memory, or, in a write-through cache, data is written to the cache concurrently with the writing of the data to the main memory. When the processor desires to write data to memory, the cache controller checks the cache directory to determine if the data block into which data is to be written resides in the cache. If the data block exists in the cache, the processor writes the data into the data block in the cache. If the data block into which data is to be written is not in the cache, the data block must be fetched into the cache or the data written directly into the main memory.

In complex cached computer systems, to debug the operation of the cache controller, it is desirable to determine the actual contents of the cache at a point in time. However, the cache is transparent to the computer system, so determining the data that exists in the cache at a particular point in time is very difficult. Specifically, any attempt to access data in the cache is likely to result in reallocation of the cache contents.

SUMMARY OF THE INVENTION

In accordance with the preferred embodiment of the present invention, a method is presented for dumping the contents of a cache directory and cache data RAM. In order to dump the cache directory, access to the cache data RAM is disabled. Then the address tags within the cache directory are read sequentially. This is done for each address tag by applying an index for an address tag to the cache directory. In response, the cache directory places the address tag within a register. The address tag is then read from the register.

The dump of the cache directory may be implemented using a sequencer. During a cache directory dump, the sequencer places a sequence of indexes upon the input of the cache directory. As a result, the cache directory places on its output an address tag. The address tag is captured by the register. In the preferred embodiment of the present invention, the register is not large enough to simultaneously hold all bits of an address tag. Therefore, a multiplexer is used to select bits from the output of the cache directory to be placed in the register. The multiplexer is controlled by the sequencer so that each address tag may be obtained using multiple reads of the register.

The dump of the cache data RAM is performed by allocating new addresses to cache data in the cache data RAM. This is done, for example, by blocking writes to the cache data RAM while enabling read access from the cache data RAM and both read and write access to the cache directory. A reserved block of cacheable memory is then accessed. What is meant by cacheable memory is memory locations for which the cache data RAM may be used when accessing data therein. On the other hand, the cache data RAM is not used for accesses for non-cacheable memory. When the reserved block of cacheable memory is accessed, address tags for addresses of the reserved block of cacheable memory are written into the cache directory; however, data from the reserved block of cacheable memory is not written into the cache data RAM. Data in the cache data RAM is now accessible using addresses for the reserved block of cacheable memory.

In the preferred embodiment of the present invention, accessing the reserved block of cacheable memory is performed by programming code in non-cacheable memory. This prevents the execution of the programming code from interfering with the allocation of space in the cache data RAM. The dump of the cache data RAM may be implemented using logic which, in response to a value of a write enable suppression bit in a test status register, prevents a write enable signal generated by write enable logic from reaching the cache data RAM.

DESCRIPTION OF THE PREFERRED EMBODIMENT

Figure 1:
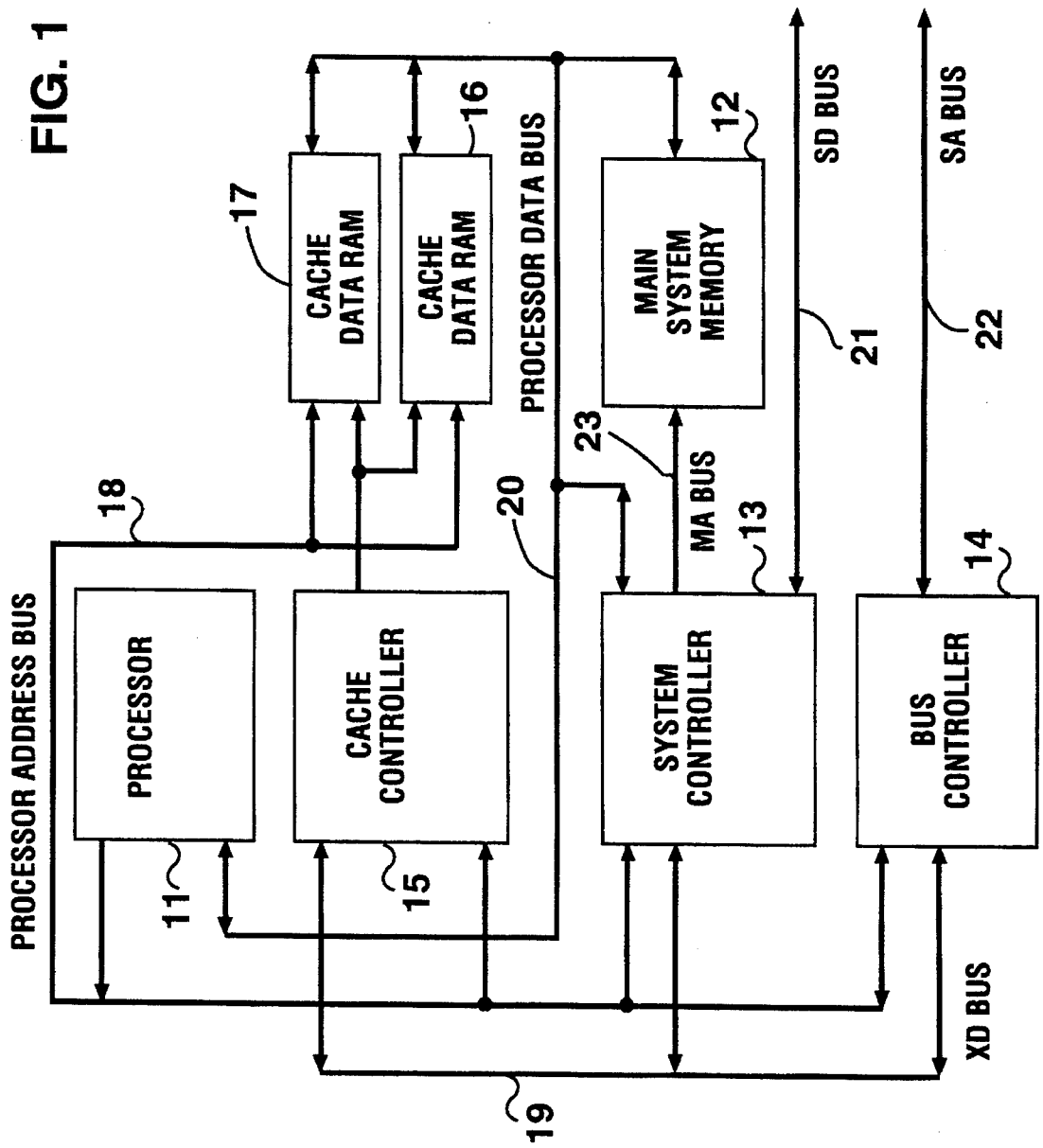
FIG. 1 is a simplified block diagram of a cache memory within a complex cached computer system.

FIG. 1 shows a simplified block diagram of a computer system. The computer system contains a processor 11, a main system memory 12, a system controller 13, a bus controller 14, a cache controller 15, a cache data random access memory (RAM) 16 and a cache data RAM 17. System controller 13 is responsible for generating control signals for data accesses from main system memory 12. System controller is, for example, a VL82C320A System Controller Interface available from VLSI Technology, Inc. having a business address of 1109 McKay Drive, San Jose, Calif. 95131.

Bus controller 14 is responsible for generating control signals for accessed data that is not located in main system memory 12. Such data may be stored, for example, in read only memory (ROM) or by a peripheral device. Bus controller 14 is, for example, a VL82C331 Bus Controller Interface also available from VLSI Technology, Inc. A memory address (MA) bus 23 is an address bus from system controller 13 to main memory 12. A system address (SA) bus 22 is an address bus portion of the system bus used to address expansion slots and ROM. A system data (SD) bus 21 is the data bus portion of the system bus used for expansion slots and ROM. A transmit data (XD) bus 19 is a buffered version of the lowest byte of data on SD bus 21. XD bus 19 is used to transfer data to or from the internal registers within cache controller 15, system controller 13 or bus controller 14 during input/output cycles.

The computer system includes a processor data bus 20 and a processor address bus 18. In order to access (i.e. read or write) data, processor 11 places an address of a memory location on processor address bus 18. If cache controller 15 determines the contents of the addressed memory location reside in cache data RAM 16 or cache data RAM 17, the cache controller enables the access of the appropriate cache data RAM. In the case of a memory read, an access of the cache data RAM results in cache data RAM 16 or cache data RAM 17 placing data on processor data bus 20. In the case of a memory write, an access of the cache data RAM results in cache controller 15 writing data into cache data RAM 16 or cache data RAM 17. In the case of a write-through cache, data is also written through to main system memory 12.

If cache controller 15 determines the contents of the addressed memory location do not reside in cache data RAM 16 or cache data RAM 17, a cache miss results. The data is accessed from main system memory 12, or some other storage device. If the data accessed from main system memory 12, or some other storage device, is currently stored in memory locations that are cacheable (cacheable memory), the data access will generally result in the data being fetched into one of the cache data RAMs.

Figure 2:
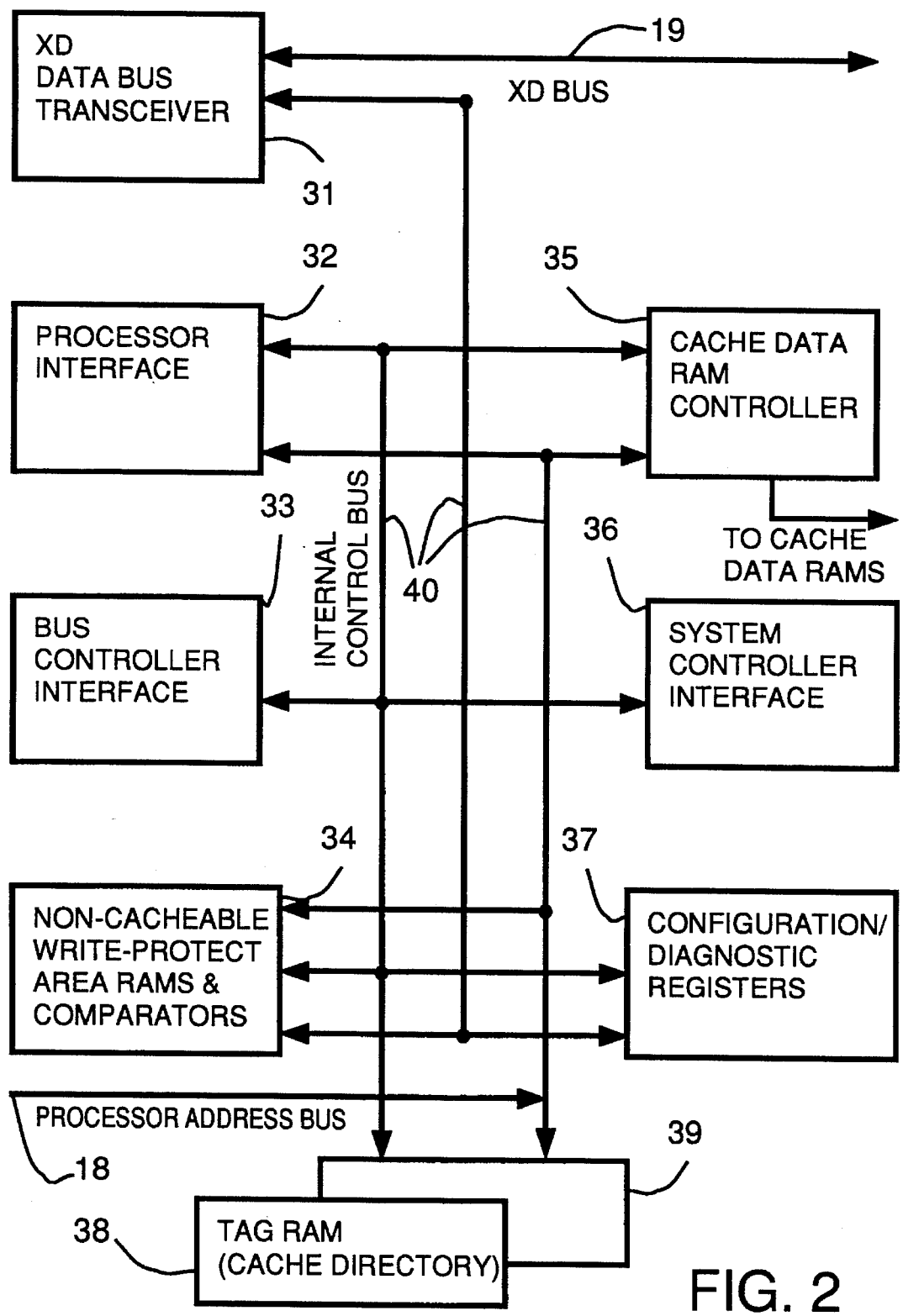
FIG. 2 is a block diagram of a cache controller shown in FIG. 1, in accordance with the preferred embodiment of the present invention.

FIG. 2 shows a block diagram of cache controller 15. Cache controller 15 is shown to include an XD bus transceiver 31, a processor interface 32, a bus controller interface 33, non-cacheable write-protect area RAMs and comparators 34, a cache data RAM controller 35, a system controller interface 36, configuration/diagnostic registers 37, a cache directory (tag RAM) 38 and a cache directory (tag RAM) 39.

Processor interface 32 monitors signals on processor address bus 18 to determine what action cache controller 15 needs to take. For example, when a memory read access results in a cache hit, cache controller 15 enables a data access of the appropriate data cache to processor data bus 20. In a memory read or write access in which there is a cache miss, cache controller 15 signals system controller 13 of the cache miss.

System controller interface 36 provides for communication of cache controller 15 with system controller 13. Bus controller interface 33 provides for communication of cache controller 15 with bus controller 14. XD data bus transceiver 31 is used to interface with XD bus 19. Non-cacheable write-protect area RAMs and comparators 34 include I/O registers which are not memory mapped. These I/O registers form programmable look-up tables in which the user may define cacheability for various address regions. Non-cacheable RAM, which is accessed without use of cache data RAM 16 or cache data RAM 17, may be defined to reside in main system memory 12, slot bus memory, or elsewhere in the computer system.

Figure 3:
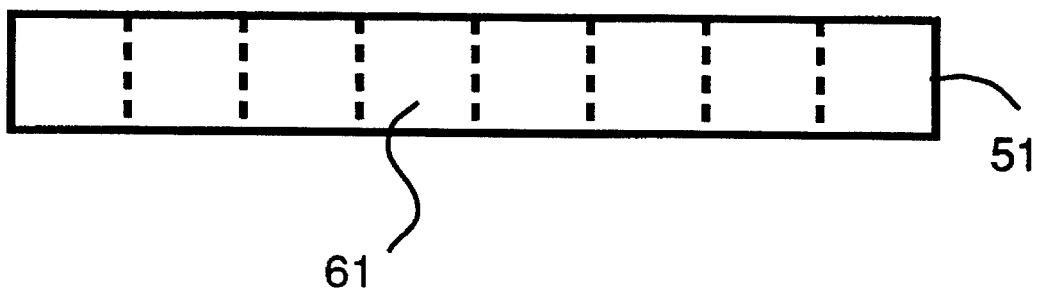
FIG. 3 shows three registers contained within the cache controller shown in FIG. 2, in accordance with the preferred embodiment of the present invention.
Figure 3:
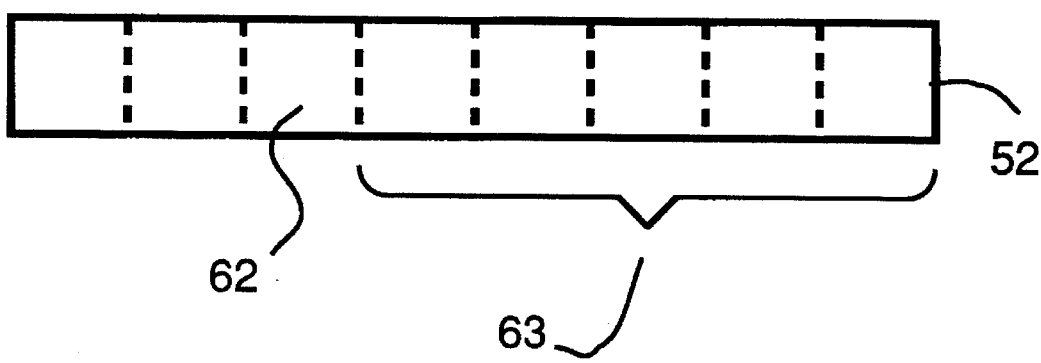
Figure 3:
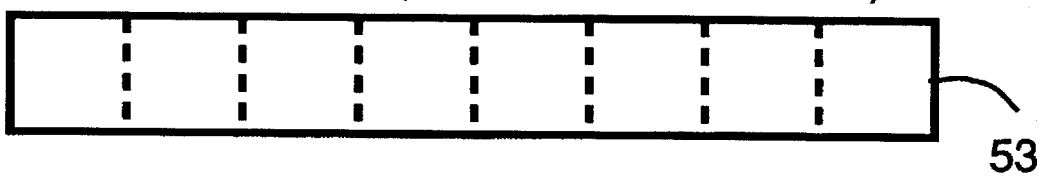

FIG. 3 shows three of configuration/diagnostic registers 37. A cache configuration register 51 is shown to include a cache enable bit 61. Cache controller 15 is enabled by setting cache enable bit 61 to a logic 1. Cache controller 15 is disabled by clearing cache enable bit 61 to a logic 0.

A test status register 52 includes a block cache write enable bit 62. A cache write enable signal generated by cache controller 15 is blocked when block cache write enable bit 62 is set to a logic 1. A cache write enable signal generated by cache controller 15 operates normally when block cache write enable bit 62 is cleared to a logic 0. Test status register also includes five bits for a diagnostic opcode 63. When diagnostic opcode 63 has a value of $01000_{base\ 2}$, this indicates cache controller 15 is to dump the contents of tag RAM 38. When diagnostic opcode 63 has a value of $10000_{base\ 2}$, this indicates cache controller 15 is to dump the contents of tag RAM 39. A tag RAM data (RAMDATA) register 53 is used to receive addresses dumped from tag RAM 38 or tag RAM 39.

Figure 4:
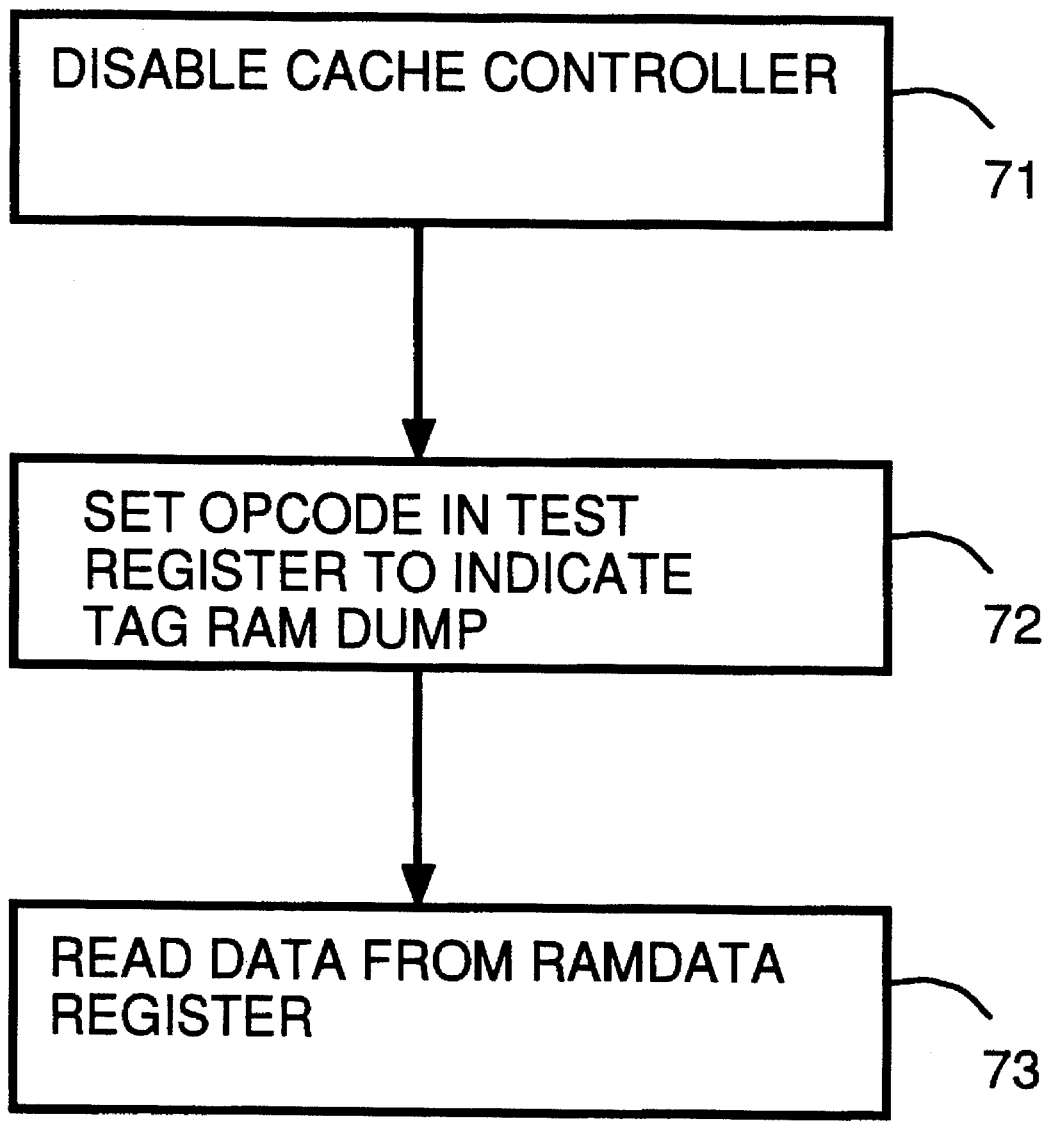
FIG. 4 is a flowchart which sets out a method for dumping address tags from a cache directory within the cache controller shown in FIG. 2, in accordance with the preferred embodiment of the present invention.

FIG. 4 sets out a simplified flowchart of a method for dumping address tags from the cache directory. In a step 71, cache enable bit 61 is cleared to disable cache controller 15, and thus disable the cache. In a step 72, diagnostic opcode 63 is set to $01000_{base\ 2}$ to indicate cache controller 15 is to dump the contents of tag RAM 38, or is set to $10000_{base\ 2}$ to indicate cache controller 15 is to dump the contents of tag RAM 39. In a step 73, data is read from tag RAM data register 53 and written to a location in main system memory 12 to complete the dump.

Figure 5:
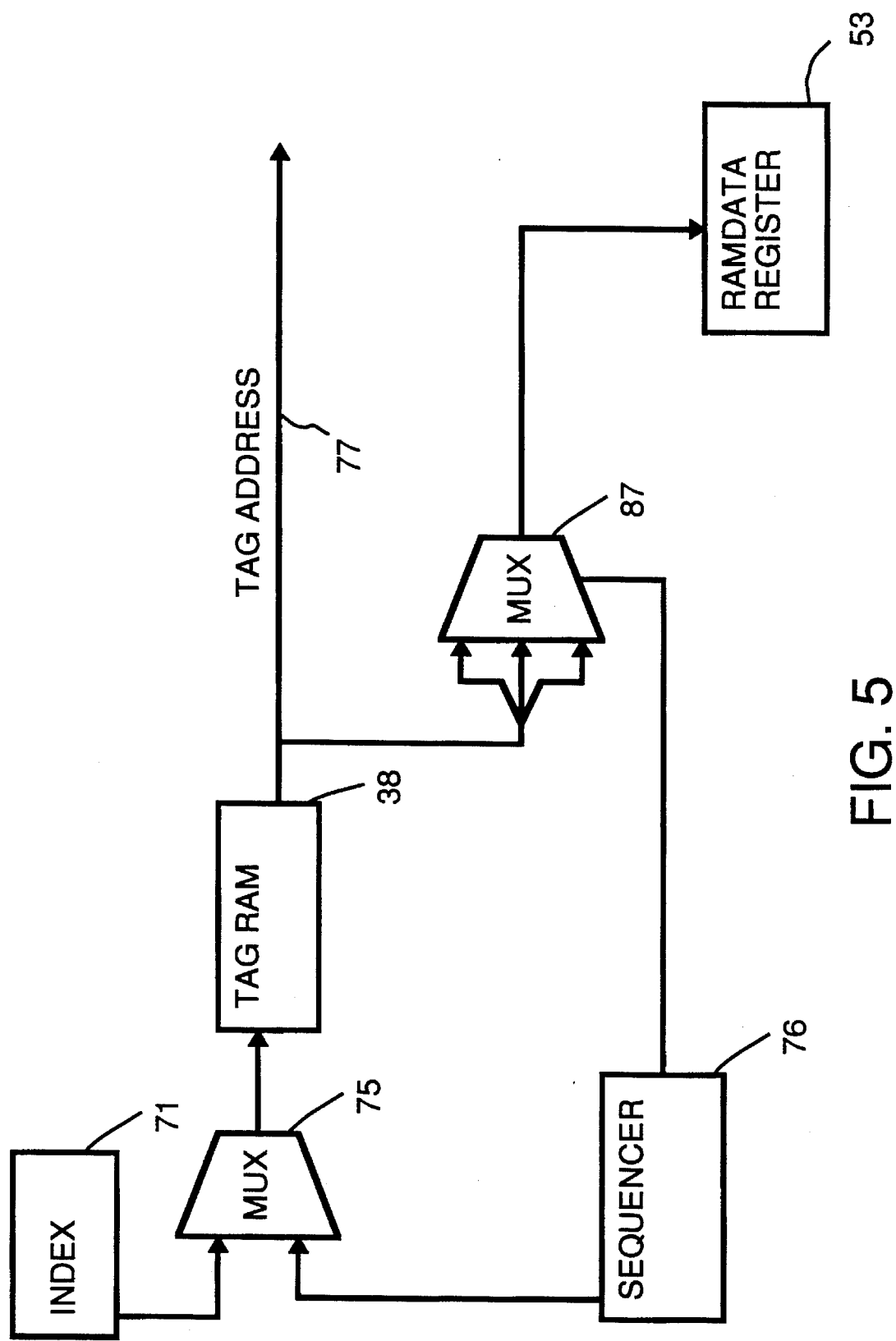
FIG. 5 is a simplified logic block diagram which sets out simplified logic used to implement the method described in FIG. 4, in accordance with the preferred embodiment of the present invention.

FIG. 5 shows a simplified block diagram of logic used to perform the dump of tag RAM address tags. Within cache controller 15, when an index 74 is placed at an input of tag RAM 38, tag RAM 38 places a tag address on lines 77. During a tag RAM dump, a multiplexer 75, places the output of a sequencer 76 on the input of tag RAM 38. On successive reads, sequencer 76 sequences through a read of all address tags in tag RAM 38 by placing of a sequence of indexes upon the input of the cache directory. Tag RAM data (RAMDATA) register 53 intercepts the tag addresses placed on lines 77. In the preferred embodiment, tag RAM 38 contains 1024 20-bit address tags, while tag RAM data register 53 is an eight-bit register. Therefore, 3072 reads need to be performed to dump the entire contents of tag RAM 38. For each read, a multiplexer 78, controlled by sequencer 76, selects a set of bits from lines 77 to place in tag RAM data register 53.

Figure 6:
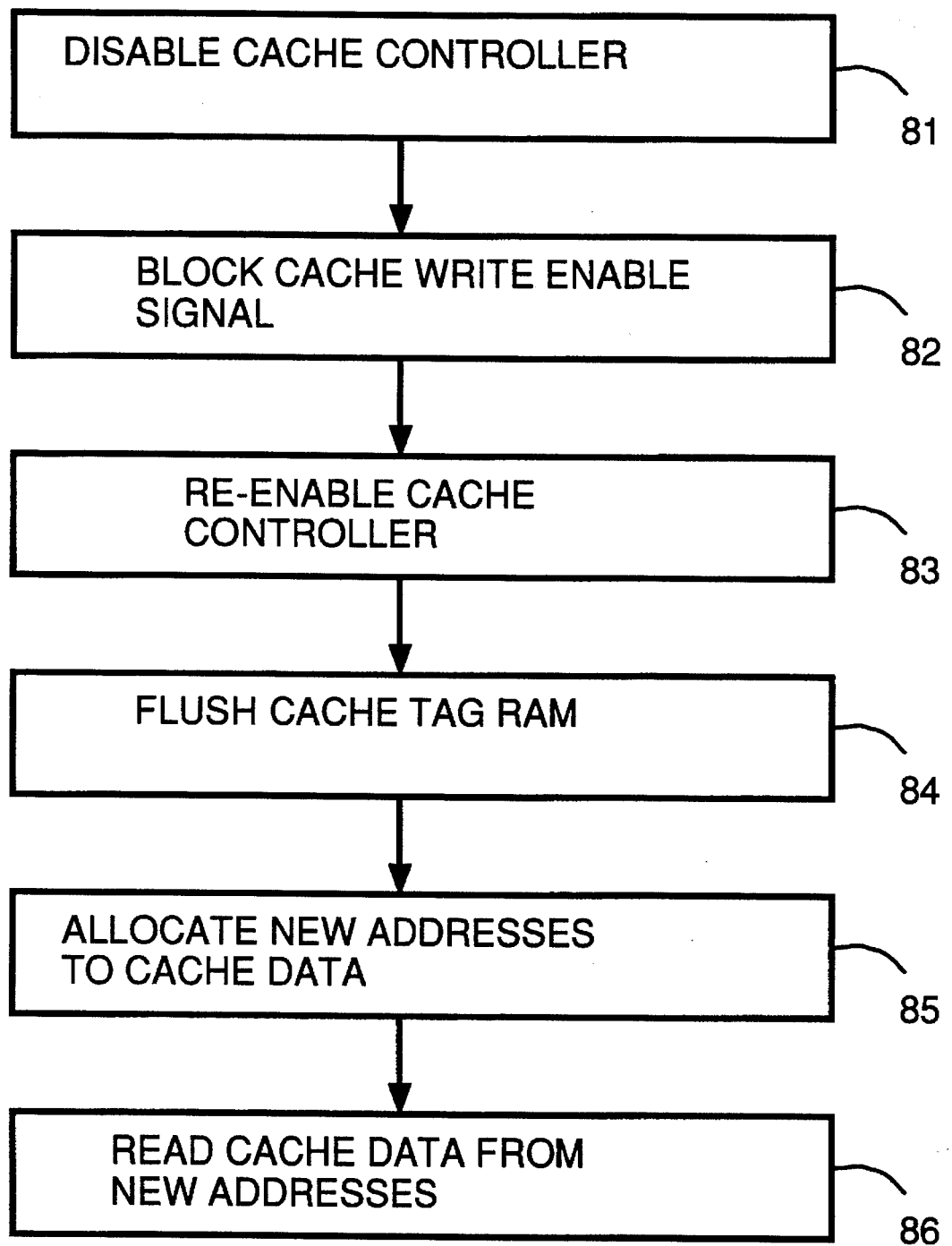
FIG. 6 is a flowchart which sets out a method for dumping data from a data cache shown in FIG. 1, in accordance with the preferred embodiment of the present invention.

FIG. 6 sets out a simplified flowchart of a method for dumping the data within cache data RAM 16 and/or cache data RAM 17. This method of dumping data from the cache data RAM 16 and/or cache data RAM 17 may be performed directly after dumping tag RAM address tags, as described above.

In a step 81, cache enable bit 61 is cleared to disable cache controller 15, and thus disable the cache. In a step 82, the cache write enable signal is blocked by setting block cache write enable bit 62 in test status register 52. This blocks the cache write enable outputs of cache controller 15, preventing writes to cache data RAM 16 and cache data RAM 17. In a step 83, cache enable bit 61 is set to enable cache controller 15, and thus enable the cache.

In a step 84, cache directory (tag RAM) 38 and cache directory (tag RAM) 39 are flushed. In a step 85, new addresses are allocated to data within cache data RAM 16 and cache data RAM 17. This is done, for example, by using a reserved contiguous block of data which is in main system memory 12. The size of this reserved contiguous block of data is equal to the combined size of cache data RAM 16 and cache data RAM 17. The reserved contiguous block of data is read sequentially. It is important that programming code which performs the read of data from the reserved contiguous block of data is stored in non-cacheable RAM as defined by registers within non-cacheable write-protect area RAMs and comparators 34. Further, any stack or variable used by the programming code also should be stored in non-cacheable RAM. This is important so that the executing of the programming code does not interfere with the allocation of space in cache data RAM 16 and cache data RAM 17.

In a step 86, the contents of the cache data RAM 16 and cache data RAM 17 may now be read (dumped) using the addresses for the reserved contiguous block of data.

Figure 7:
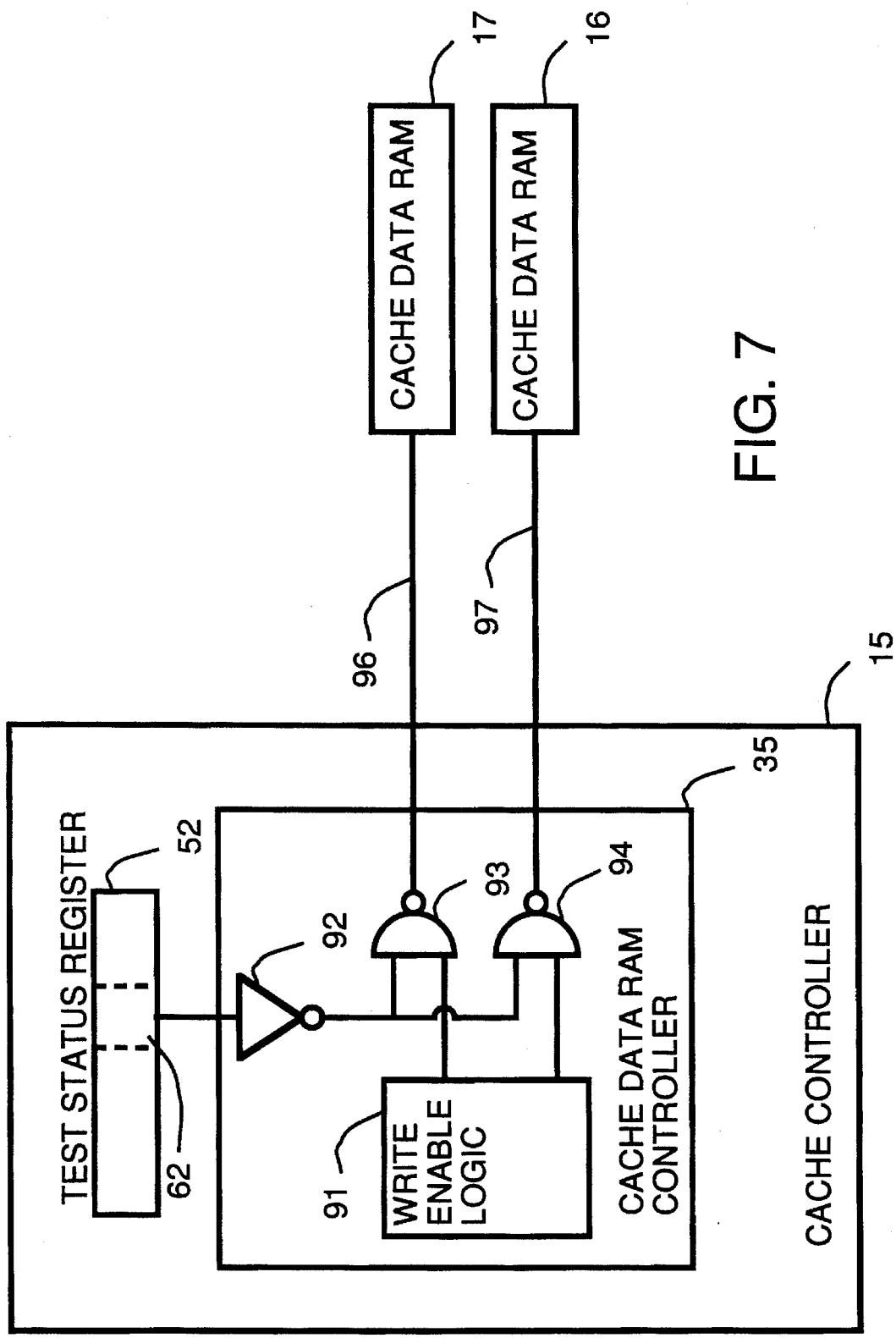
FIG. 7 is a simplified logic block diagram which sets out simplified logic used to implement the method described in FIG. 6, in accordance with the preferred embodiment of the present invention.

FIG. 7 shows a simplified block diagram of logic which could be used to block cache write enable signals. Within cache data RAM controller 35 of cache controller 15, write enable logic 91 is used to generate write enable signals for active-low write enable input 95 of cache data RAM 16 and for active-low write enable input 96 of cache data RAM 17. The value of cache write enable bit 62 in test status register 52 is input to logic circuitry to gate the write enable signals generated by write enable logic 91. For example, an inverter 92, a logic NAND gate 93 and a logic NAND gate 94 are shown as simplified logic circuitry which could be used to gate the write enable signals.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for dumping the contents of a cache directory and cache data random access memory (RAM), the method comprising the steps of:

(a) disabling access to the cache data RAM;

(b) performing the following substeps for each address tag within the cache directory
 (b.1) applying an index for an address tag to the cache directory,
 (b.2) placing that address tag within a register, and
 (b.3) reading the register; and, (c) allocating new addresses to cache data in the cache data RAM.

2. A method as in claim 1 wherein in step (b), each address tag is larger than the register, requiring substep (b.3) to include multiple reads of the register to access each address tag.

3. A method as in claim 1 wherein step (c) includes the following substeps:

(c.1) blocking writes to the cache data RAM;

(c.2) enabling read access from the cache data RAM and both read and write access to the cache directory;

(c.3) flushing the cache directory;

(c.4) sequentially accessing a reserved block of cacheable memory, the access of the cacheable memory resulting in address tags for addresses of the reserved block of cacheable memory being written into the cache directory, but data from the reserved block of cacheable memory not being written into the cache data RAM; and, (c.5) accessing data in the cache data RAM using the addresses for the reserved block of cacheable memory.

4. A method as in claim 3 wherein substep (c.4) is performed by code in non-cacheable memory.

5. A cache data random access memory (RAM) controller, coupled to a cache data RAM, the cache data RAM controller comprising:

cache directory means for storing address tags of data stored in the cache data RAM, the cache directory means having an input and an output, wherein in response to an index being placed on the input, the cache directory means produces an address tag on the output;

data RAM register means for receiving address tags placed on the output of the cache directory means during a cache directory dump; and, sequencer means for placing a sequence of indexes upon the input of the cache directory means during a cache directory dump.

6. A cache data RAM controller as in claim 5 wherein the data RAM register means is not large enough to simultaneously hold all bits of an address tag and wherein the cache data RAM controller additionally comprises:

multiplexer means, coupled between the cache directory means and the data RAM register means, for selecting bits from the output of the cache directory means to be placed in the data RAM register means, wherein the multiplexer means is controlled by the sequencer means.

* * * * *